United States Patent [19]
O'Brien et al.

[11] Patent Number: 5,635,999
[45] Date of Patent: Jun. 3, 1997

[54] IRIS DIAPHRAGM FOR HIGH SPEED PHOTOGRAPHIC PRINTERS HAVING IMPROVED SPEED AND RELIABILITY

[75] Inventors: Michael J. O'Brien; Richard A. Colleluori, both of Rochester, N.Y.

[73] Assignee: Eastman Kodak Company, Rochester, N.Y.

[21] Appl. No.: 444,457

[22] Filed: May 19, 1995

[51] Int. Cl.⁶ .................. G03B 9/06; G03B 9/22
[52] U.S. Cl. ......................... 396/508; 355/71
[58] Field of Search ............... 354/271.1, 274; 355/71, 74

[56] References Cited

U.S. PATENT DOCUMENTS

| | | | |
|---|---|---|---|
| 2,393,408 | 1/1946 | Peterson | 354/271.1 |
| 3,572,906 | 3/1971 | Kitsopoulos | 350/269 |
| 3,744,393 | 7/1973 | Uchiyama et al. | 95/64 B |
| 4,006,986 | 2/1977 | Kuehnle | 355/14 |
| 4,444,489 | 4/1984 | Bartel et al. | 355/35 |
| 4,470,687 | 9/1984 | Saito et al. | 354/435 |
| 4,609,273 | 9/1986 | Kaise | 354/271.1 |
| 4,884,091 | 11/1989 | Nakagomi | 354/271.1 |
| 4,961,087 | 10/1990 | Gandini et al. | 355/71 |
| 5,038,168 | 8/1991 | Kurimoto et al. | 355/56 |
| 5,140,212 | 8/1992 | Iwasaki et al. | 310/191 |
| 5,325,142 | 6/1994 | Depatie et al. | 354/234.1 |
| 5,337,110 | 8/1994 | Dowe | 354/230 |

Primary Examiner—Safet Metjahic
Assistant Examiner—Christopher E. Mahoney
Attorney, Agent, or Firm—Peyton C. Watkins

[57] ABSTRACT

An iris diaphragm for selectively varying a diameter of an aperture, the iris diaphragm comprises at least two movable blades which are adaptable for forming the aperture. A moveable drive coil drives the blades which motion of the drive coil provides unison movement with the blades, wherein the movement of the drive coil imparts motion to said blades for varying the aperture.

25 Claims, 5 Drawing Sheets

IRIS DIAPHRAGM FOR HIGH SPEED PHOTOGRAPHIC PRINTERS HAVING IMPROVED SPEED AND RELIABILITY

CROSS-REFERENCE TO RELATED APPLICATIONS

The present application is related to U.S. application 08/445,434 filed May 19, 1995 entitled "A METHOD FOR ASSEMBLING AN IRIS DIAPHRAGM", filed concurrently with the present application by Michael J. O'Brien, Richard A. Colleluori and William P. Luce which is hereby incorporated by reference.

FIELD OF INVENTION

The invention relates generally to the field of high speed photographic printers and, more particularly, to a high speed photographic printer having an iris diaphragm with improved reliability for reducing maintenance and replacement, and with improved speed for permitting an aperture of the iris to be adjusted between images.

BACKGROUND OF THE INVENTION

A high speed photographic printer typically includes a light source under which a roll of developed film containing images on negatives is rapidly and continuously passed for reproducing the images on a roll of photosensitive paper, which is placed beneath the film. A lens assembly is placed between the paper and the roll of film for focusing the image and the amount of light which is directed onto the paper. The lens assembly includes two moveable groups of elements for controlling the magnification of the image and an iris diaphragm for controlling the amount of light.

The typical iris diaphragm includes a plurality of moveable blades for forming an adjustable aperture through which the light passes. The blades are typically controlled by a stepper motor which, via movement of the blades, induces the variation of the aperture. This configuration is discussed in detail in U.S. Pat. No. 4,444,489.

Although the above described system and method for varying the aperture are satisfactory, they are not without drawbacks. It takes approximately two or three seconds to adjust the diameter of the aperture, and for high speed photographic printers, such a response time is insufficient to allow the aperture to change between images on the same roll of film because of the rapid speed at which the film is moving under the light source. High speed photographic printers typically require a quick response time, approximately 50 milli-seconds between images. Therefore, the entire roll of film is printed at one aperture setting, and if changes are needed for any of these printed images, the aperture is then adjusted and the copying process repeated. This consumes time, which obviously adds additional cost to the printing process.

In addition, the stepper motor and its associated blades should be replaced after approximately two million actuations because experience has shown this to be its expected lifetime. For high speed photographic printers, two million actuations are consumed in a short period of time. For this reason, the durability of the stepper motor arrangement is inadequate for high speed photographic printers.

Finally, the stepper motor arrangement consumes a great amount of space. This is obviously undesirable because it increases the size of the photographic printer.

Consequently, a need exists for an iris diaphragm having a fast response time for permitting aperture variations between images, and having improved durability for reducing maintenance and replacement.

SUMMARY OF THE INVENTION

The present invention is directed to overcoming one or more of the problems set forth above. Briefly summarized, the present invention resides in an iris diaphragm for selectively varying a diameter of an aperture, the iris diaphragm comprising: (a) at least two movable blades which are adaptable for forming the aperture; and (b) a moveable drive coil which moves, when energized, for providing unison movement with said blades, wherein the movement of said drive coil imparts the unison motion to said blades for varying the aperture.

It is an object of the present invention to provide an iris diaphragm having a fast response time for permitting aperture variations between images, and having improved reliability for reducing maintenance and replacement.

It is an advantage of the present invention to provide an iris diaphragm which is compact for reducing space requirements.

It is a feature of the present invention to provide a moveable drive coil which moves in unison with and drives the blades of the iris diaphragm for varying the aperture.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the following advantages. The iris diaphragm of the present invention has a response time of approximately 22 milli-seconds between the maximum and minimum aperture. It also has a life expectancy of over 400 million actuations (from maximum to minimum aperture). Still further, it includes a device for detecting the malfunctioning of the iris diaphragm.

DETAILED DESCRIPTION OF THE INVENTION

Figure 1:
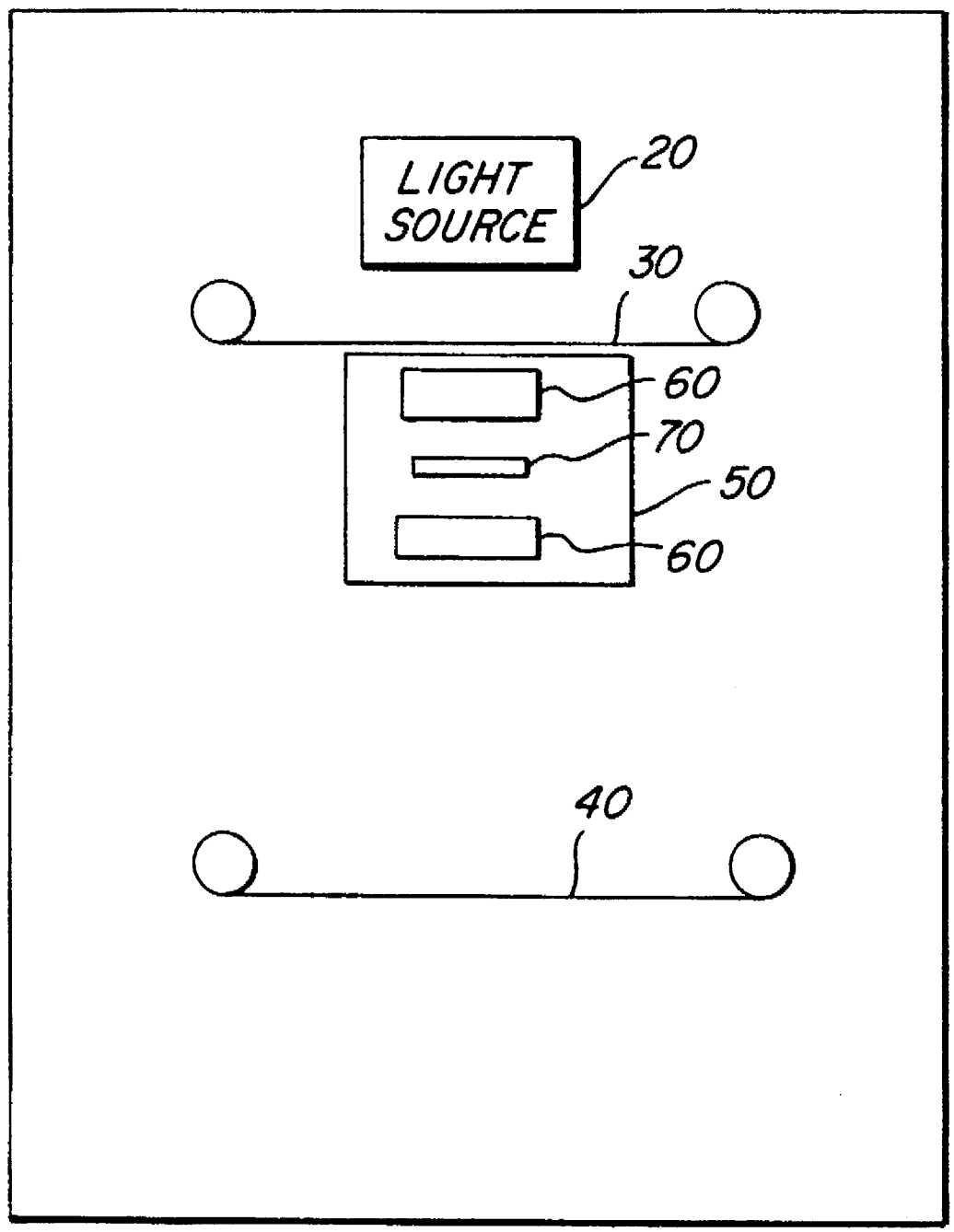
FIG. 1 is a schematic diagram of a typical high speed photographic printer.

Referring to FIG. 1, there is illustrated a high speed photographic printer 10 having a light source 20 under which a roll of developed film 30 containing images in negative form is rapidly and continuously passed. A roll of photosensitive paper 40 is placed under the film 30 for capturing the images from the negatives thereon. A lens assembly 50 is placed between the film 30 and paper 40 for controlling the intensity and amount of light passing onto the paper 40. The lens assembly 50 includes two zoom lens elements 60 for controlling the degree of magnification and an iris diaphragm 70 for controlling the amount of light.

Figure 2:
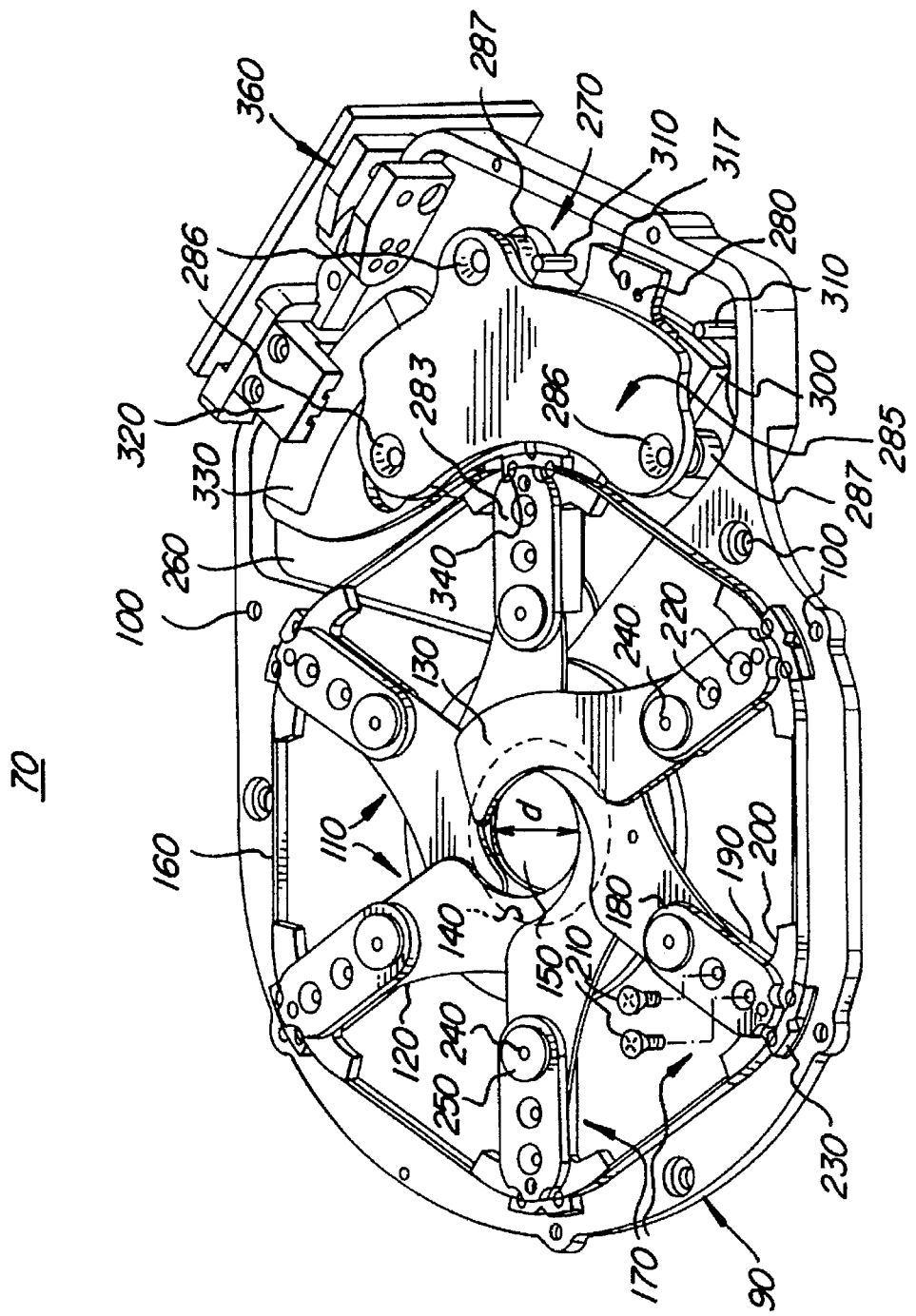
FIG. 2 is a perspective view of the iris diaphragm of the present invention.
Figure 3:
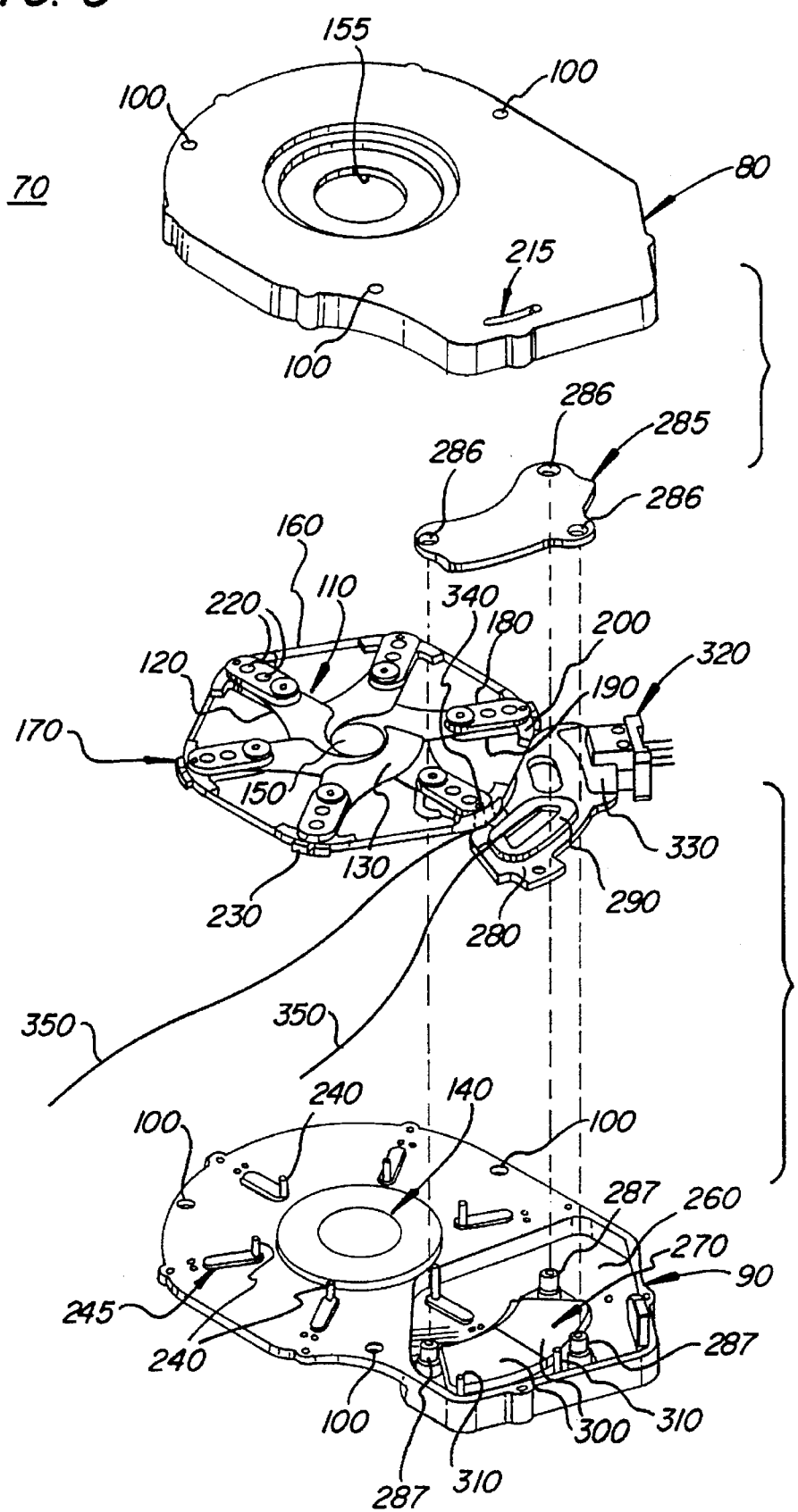
FIG. 3 is a perspective view of the iris diaphragm of the present invention illustrating its assembly.

Referring to FIGS. 2 and 3, there is illustrated in detail the iris diaphragm 70 having a top cover 80 (deleted for clarity in FIG. 1). The iris diaphragm 70 includes a bottom cover 90 which is attached to the top cop cover 80 for forming a housing for the iris diaphragm 70. A plurality of holes 100 are placed in both covers 80 and 90, and are in registry with each other for receiving screws (not shown) for attaching the top and bottom covers 80 and 90 together. A plurality of moveable blades 110 each having a stem 120 and an generally curved shape end portion 130 are placed adjacent a center opening 140 in the bottom cover 90. The blades 110 cooperative together to form a variable aperture 150 of the iris diaphragm 70. A center hole 155 is provided in the top cover 80 which, in combination with the aperture 150 and bottom center hole 140, permits light to pass through the iris diaphragm 70. The blades 110 are suspended by a yoke assembly 170 (described in detail below), and are movable so that a diameter (d) of the aperture 150 is varied as the blades 110 are moved.

Figure 4:
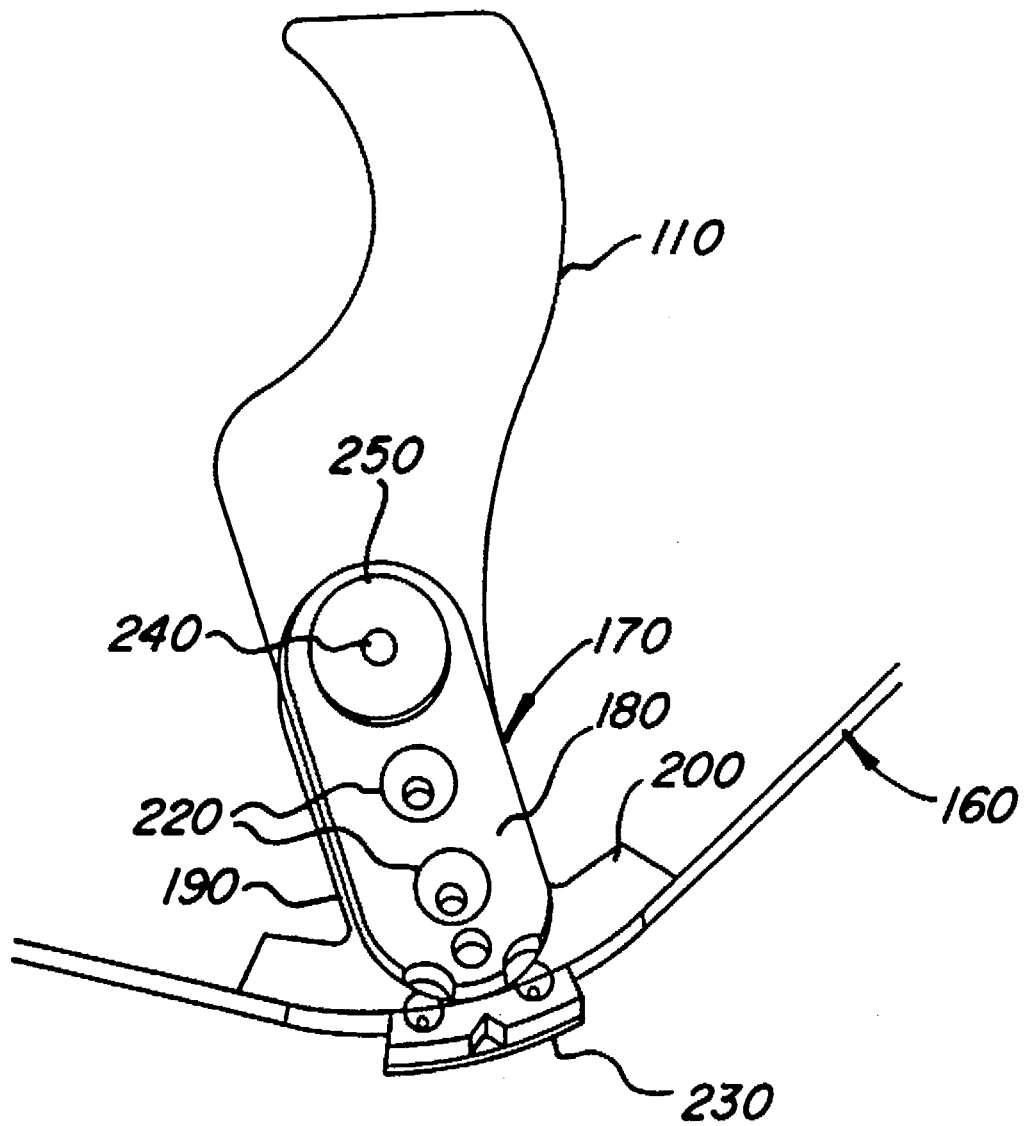
FIG. 4 is a exploded view of a yoke assembly of the present invention.

The blades 110 are moved in unison and synchronization by a drive belt 160 via a yoke 170 attached to each blade 110. Since all the yoke assemblies 170 are the same, only one will be described in detail, as best illustrated in FIG. 4. The yoke assembly 170 includes an upper arm 180 and a bottom arm 190 having an arcuate shaped end portion 200. The upper arm 180 and bottom arm 190 are placed face-to-face with a blade 110 interposed between them. The arms 180 and 190 are attached together by filling two holes 220, which extend through the blades 110 and respectively through two holes 220 in the arms 180 and 190, with a minimal shrinkage epoxy for forming a rivet-like device. The drive belt 160 is preferably glued to the end portion 200 and an end piece 230 is placed on the opposite side of the drive belt 160 for forming a rigid attachment. A pivot pin 240, whose attachment to the bottom cover 90 is described below, extends through both the arms 180 and 190 and blade 110 for forming a hinge about which the blade 110 may pivot. A pair of ball bearings 250 (only one is shown) are respectively placed atop the upper arm 180 and beneath the bottom arm 190 for permitting the yoke 170 and, in turn, the blades 110 to pivot about the pivot pin 240.

Figure 5:
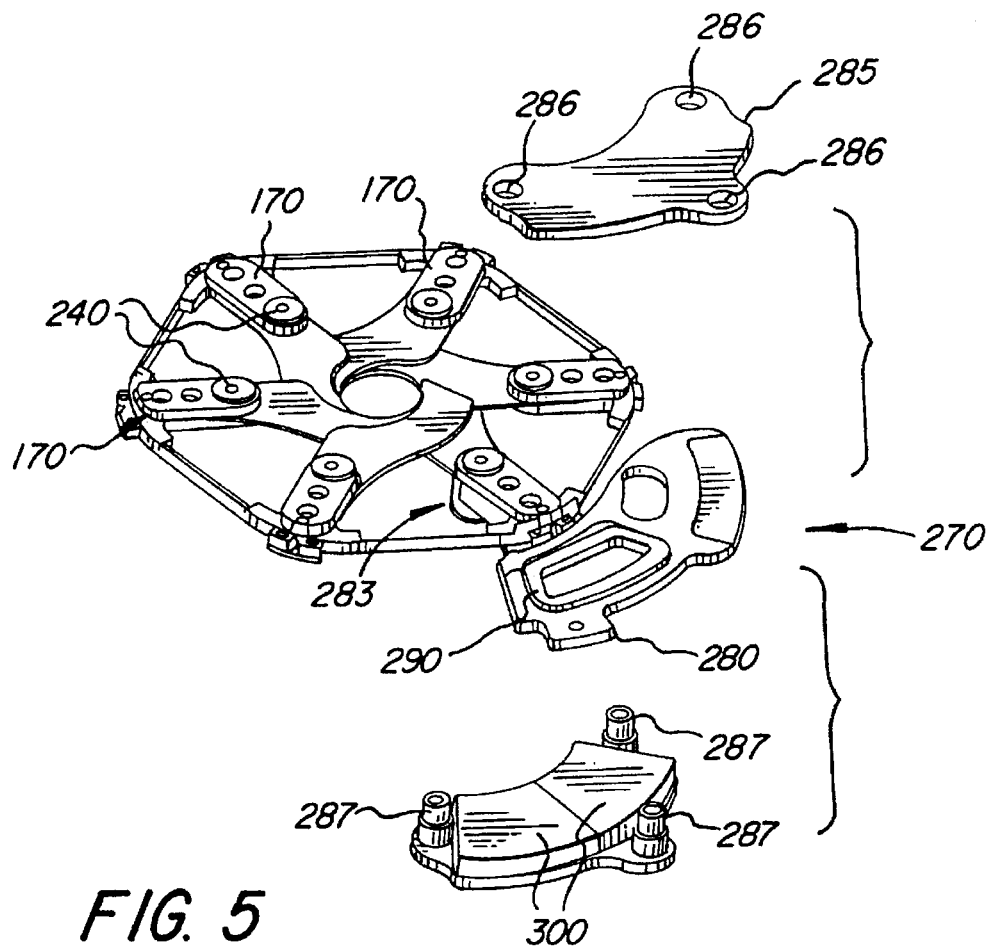
FIG. 5 is a perspective view of the present invention with portion cutaway for clarity.

Referring back to FIGS. 2 and 3, the pivot pin 240 is attached to the bottom cover 90 via a mounting member 245 integrally attached to the bottom cover 90. The bottom cover 90 includes a recessed portion 260 for mounting a diaphragm actuator 270, which drives the drive belt 160. Referring to FIG. 5, the actuator 270 includes a support plate 280 which is suspended in space by and attached to an attaching yoke 283 via the end piece 230 (not clearly shown in FIG. 5). A top plate 285 is attached, via three screws (not shown) respectively extending through three holes 286 in the top plate 285, to three posts 287 secured in the recessed portion 260 for forming an enclosure of the actuator 270.

The actuator 270 further includes a drive coil 290 resting in a closed loop configuration which, when energized by an electrical current, creates an electrical field. This electrical field exerts a force on magnets 300 placed downwardly from the coil 290 on the recessed portion 260, which combination of forces (i.e., the electrical field force and a force created by the magnets) causes the support plate 280 to swing sidewardly. This movement, as might be apparent, causes the attaching yoke 283 to move in unison with the movement of the support plate 280. Since the drive belt 160 is attached to the attaching yoke 283 and to each yoke assembly 170, the movement of attaching yoke 283, consequently, causes each yoke assembly 170 to move in unison and synchronization with the attaching yoke 283. This causes the blades 110 to pivot about the pivot pin 240 for adjusting the diameter (d) of the aperture 150 to the desired size.

Referring back to FIGS. 2 and 3, two stops 310 are respectively placed on each side of the actuator 270 to prevent movement of the actuator 270 past each stop 310. These two positions of the actuator 270 define the maximum and minimum opening of the aperture 150 by limiting the movement of the blades 110.

A slot 315 extends through the top cover 80 and allows a suitable tool to be inserted therethrough for insertion into a hole 317 in the support plate 280. Once inserted, the tool may be moved back and forth within the slot 315 for manual manipulation of the actuator 270 for permitting manual testing of the actuator 270.

A position sensor 320 is provided for sensing a density of a variable density portion 330 of provided support plate 280. The density of the variable density portion 330 is varied to permit the sensor 320 to distinguish each density for detecting the position of the actuator 270 which translates to the size of the aperture Such a position sensor 320 and variable portion 330 is disclosed in commonly owned U.S. Pat. No. 5,325,142 which is hereby incorporated by reference. The sensor 320 output is communicated to remote, well known processing instrumentation for processing the output.

Figure 6:
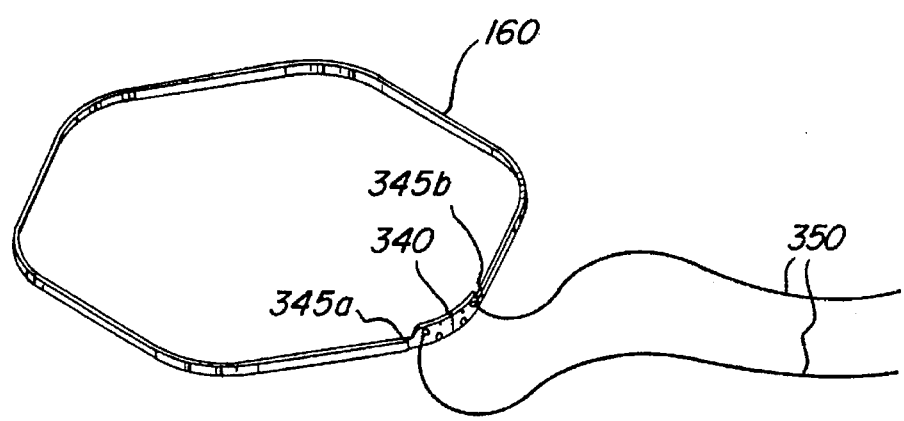
FIG. 6 is a perspective view of a portion of FIG. 2 illustrating a malfunctioning detection device of the present invention.

Referring to FIG. 6, an electrical conducting member 340 is placed between the two ends 345a and 345b of the drive belt 160 near the actuator 270 for providing a continuous, electrical conducting path. Two electrical conductors 350 are placed on the conducting member 340 for sensing the resistance of the drive belt 160. If the drive belt 160 breaks, the resistance of the drive belt 160 goes substantially high, infinity for most practical applications, which indicates that the iris diaphragm 70 is malfunctioning. The electrical conductors 350 are attached to a connector board 360 (see FIG. 2) for permitting access by well known, remote electronics (not shown) for processing the resistance values.

The invention has been described with reference to a preferred embodiment. However, it will be appreciated that variations and modifications can be effected by a person of ordinary skill in the art without departing from the scope of the invention.

In this regard, while the invention has been disclosed in the preferred embodiment as being implemented by an iris diaphragm, the invention may also be implemented on a shutter.

Parts List:
10 photographic printer
20 light source
30 film
40 paper
50 lens assembly
60 zoom lens elements
70 iris diaphragm
80 top cover
90 bottom cover
100 holes
110 moveable blades
120 stem
130 end portion
140 center opening
150 aperture
155 center hole 160 drive belt
170 yoke assembly
180 upper arm
190 bottom arm
200 end portion
220 two holes
230 end piece
240 pivot pin
245 mounting member
250 ball bearings
260 recessed portion
270 actuator
280 support plate
283 attaching member
285 top plate
286 three holes
287 three posts
290 drive coil
300 magnets
310 stops
315 slot
317 hole
320 sensor
330 density portion
340 electrical conducting member
350 electrical conductors
360 connector board

We claim:

1. An iris diaphragm for selectively varying a diameter of an aperture, the iris diaphragm comprising:
   (a) at least two movable blades which are adaptable for forming the aperture;
   (b) a moveable, electrically energizable drive coil which, when energized, rotates co-axially with one of said blades for providing unison movement with said blades, where the movement of said drive coil drives said blades for varying the aperture.

2. The iris as in claim 1 further comprising a drive belt attached to said blades for providing cooperative movement of said blades and drive coil.

3. The iris diaphragm as in claim 1 further comprising a moveable base on which said drive coil rests.

4. The iris as in claim 3 further comprising a magnet placed adjacent said drive coil for assisting in movement of said drive coil.

5. The iris as in claim 4 further comprising a stop which prevents movement of said drive coil for defining either a maximum or minimum opening of the aperture.

6. The iris as in claim 5, wherein said drive coil is wound in a substantially circular configuration on said base.

7. An iris diaphragm for selectively varying a diameter of an aperture, the iris diaphragm comprising:
   (a) at least two movable blades which are adaptable for forming the aperture;
   (b) a pivotal arm attached to said blades; and
   (c) a drive belt rigidly attached to said pivotal arm for providing cooperative movement of said blades for varying the diameter of the aperture.

8. The iris as in claim 7 further comprising a moveable drive coil which moves in unison with and drives said drive belt when said drive belt varies the aperture.

9. The iris as in claim 7 further comprising ball bearings disposed on said arm for assisting in pivoting of said arm.

10. The iris as in claim 9 further comprising a pair of ball bearings disposed on said arm for assisting in pivoting of said arm.

11. A moveable drive actuator which imparts motion to blades of an iris diaphragm for varying an aperture, the drive actuator comprising:
   (a) a moveable, electrically energizable drive coil which, when energized, rotates co-axially with one of said blades for providing unison movement with said blades, wherein the movement of said drive coil drives said blades for varying the aperture; and
   (b) a magnet positioned adjacent said coil for cooperating with said coil in imparting motion to said drive coil.

12. The drive actuator as in claim 11 further comprising a movable base on which the moveable drive coil rests.

13. The drive actuator as in claim 12 further comprising a stop which prevents movement of said drive coil for defining either a maximum or minimum opening of the aperture.

14. The drive actuator as in claim 13, wherein said magnet is disposed in a face-to-face positional relationship with said drive coil.

15. The actuator as in claim 14, wherein said coil and said magnet are positioned in a face-to-face relationship.

16. The actuator as in claim 15 further comprising a stop which prevents movement of said actuator for defining an extreme position of the diameter of the aperture.

17. A device for detecting malfunctioning of an iris diaphragm, the device comprising:
   (a) at least two movable blades which are adaptable for forming an aperture of the iris;
   (b) a drive belt extending around the blades for inducing motion to the blades;
   (c) two electrical conductors in electrical communication with said drive belt for detecting when a resistance of said drive belt is higher than a predetermined level for indicating the malfunctioning of the iris.

18. The device as in claim 17, wherein said drive belt includes two ends; and the device further comprises an electrical conducting member attached between the two ends for providing continuity of the drive belt.

19. The device as in claim 18, wherein said electrical conductors are attached to said conducting member.

20. A photographic printer for selectively varying a diameter of an aperture, the printer comprising:
   (a) at least two movable blades which are adaptable for forming the aperture of said photographic printer; and
   (b) a movable drive coil which, when energized, rotates co-axially with one of the blades for providing unison movement with said blades, wherein the movement of said drive coil drives said blades for varying the aperture.

21. The printer as in claim 20 further comprising a drive belt attached to said blades and in mechanical communication with said drive coil for providing cooperative movement of said blades and drive coil.

22. The printer as in claim 20 further comprising a moveable base on which said drive coil rests.

23. The printer as in claim 22 further comprising a magnet placed adjacent said drive coil for assisting in movement of said drive coil.

24. The printer as in claim 23 further comprising a stop which prevents movement of said drive coil for defining either a maximum or minimum opening of the aperture.

25. The printer as in claim 24, wherein said drive coil is wound in a substantially circular configuration on said base.

* * * * *